United States Patent
Rastogi et al.

(10) Patent No.: US 10,313,211 B1
(45) Date of Patent: Jun. 4, 2019

(54) DISTRIBUTED NETWORK SERVICE RISK MONITORING AND SCORING

(71) Applicant: Avi Networks, Santa Clara, CA (US)

(72) Inventors: Gaurav Rastogi, San Francisco, CA (US); Sandeep Yadav, San Jose, CA (US); Murali Basavaiah, Sunnyvale, CA (US)

(73) Assignee: Avi Networks, Santa Clara, CA (US)

( * ) Notice: Subject to any disclaimer, the term of this patent is extended or adjusted under 35 U.S.C. 154(b) by 283 days.

(21) Appl. No.: 15/246,228

(22) Filed: Aug. 24, 2016

Related U.S. Application Data

(60) Provisional application No. 62/209,808, filed on Aug. 25, 2015.

(51) Int. Cl.
*H04L 12/24* (2006.01)
*H04L 12/26* (2006.01)
(Continued)

(52) U.S. Cl.
CPC ........ *H04L 43/065* (2013.01); *H04L 41/0631* (2013.01); *H04L 41/0677* (2013.01);
(Continued)

(58) Field of Classification Search
CPC . H04L 43/065; H04L 43/045; H04L 41/0631; H04L 41/0677; H04L 63/1425; H04L 63/1433; H04L 67/10
(Continued)

(56) References Cited

U.S. PATENT DOCUMENTS 5,109,486 A * 4/1992 Seymour ........... G06F 15/17356
 709/220
5,781,703 A * 7/1998 Desai ................. G06F 11/3495
 706/50
(Continued)

OTHER PUBLICATIONS

Xuehai Zhang et al., A Performance Study of Monitoring and Information Services for Distributed Systems, Proceedings of the 12th IEEE International Symposium on High Performance Distributed Computing (HPDC'03) 2003 (Year: 2003).*
(Continued)

*Primary Examiner* — Kambiz Zand
*Assistant Examiner* — Mahabub S Ahmed
(74) *Attorney, Agent, or Firm* — Van Pelt, Yi & James LLP

(57) ABSTRACT

A method for evaluating health of a distributed network service environment (DNSE) includes determining an application performance measurement (APM) based at least in part on performance metrics (PM) associated with sources, where the sources are associated with the DNSE. The sources include service engine(s) and servers. At least some of the servers are configured to provide a distributed application, and the service engine(s) are configured to provide the servers with a network service and collect at least a part of the PM. The method includes determining a health risk of the DNSE based at least in part on risk parameters obtained by the service engine(s). The method includes combining the APM and the health risk of the DNSE to determine a health indicator. If the indicator indicates a change of the DNSE, a notification of the change is generated. The method includes outputting the notification of the change.

20 Claims, 12 Drawing Sheets

(51) Int. Cl.
*H04L 29/06* (2006.01)
*H04L 29/08* (2006.01)

(52) U.S. Cl.
CPC ........ *H04L 43/045* (2013.01); *H04L 63/1425* (2013.01); *H04L 63/1433* (2013.01); *H04L 67/10* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 6,148,335 A * | 11/2000 | Haggard | ................. | H04L 41/22 709/224 |
| 6,449,739 B1 * | 9/2002 | Landan | ................. | G06F 11/323 709/224 |
| 6,792,458 B1 * | 9/2004 | Muret | ................. | G06Q 30/06 709/217 |
| 6,792,460 B2 * | 9/2004 | Oulu | ................. | G06F 11/3495 709/224 |
| 6,901,051 B1 * | 5/2005 | Hou | ................. | H04L 43/02 370/231 |
| 6,996,778 B2 * | 2/2006 | Rajarajan | ................. | G06F 9/5055 715/734 |
| 7,246,159 B2 * | 7/2007 | Aggarwal | ................. | G06F 11/3495 709/220 |
| 7,353,272 B2 * | 4/2008 | Robertson | ................. | H04L 41/022 709/202 |
| 7,430,610 B2 * | 9/2008 | Pace | ................. | G06F 8/60 709/233 |
| 7,933,988 B2 * | 4/2011 | Nasuto | ................. | G06F 11/3419 370/328 |
| 8,112,471 B2 * | 2/2012 | Wei | ................. | H04L 67/1008 709/202 |
| 8,588,069 B2 * | 11/2013 | Todd | ................. | H04L 29/06027 370/232 |
| 8,874,725 B1 * | 10/2014 | Ganjam | ................. | H04L 43/0817 709/224 |
| 9,210,056 B1 * | 12/2015 | Choudhary | ................. | G06F 16/284 |
| 9,483,286 B2 * | 11/2016 | Basavaiah | ................. | H04L 67/1002 |
| 9,531,614 B1 * | 12/2016 | Nataraj | ................. | H04L 29/08072 |
| 9,571,516 B1 * | 2/2017 | Curcic | ................. | H04L 63/1433 |
| 9,608,880 B1 * | 3/2017 | Goodall | ................. | H04L 43/045 |
| 9,680,699 B2 * | 6/2017 | Cohen | ................. | H04L 67/34 |
| 9,692,811 B1 * | 6/2017 | Tajuddin | ................. | H04L 67/10 |
| 9,729,414 B1 * | 8/2017 | Oliveira | ................. | H04L 43/0805 |
| 2002/0078150 A1 * | 6/2002 | Thompson | ................. | G06Q 10/10 709/204 |
| 2002/0198984 A1 * | 12/2002 | Goldstein | ................. | G06F 11/323 709/224 |
| 2002/0198985 A1 * | 12/2002 | Fraenkel | ................. | G06F 11/3409 709/224 |
| 2003/0191837 A1 * | 10/2003 | Chen | ................. | H04L 41/142 709/224 |
| 2004/0064552 A1 * | 4/2004 | Chong | ................. | G06F 11/3006 709/224 |
| 2005/0010578 A1 * | 1/2005 | Doshi | ................. | G06F 11/3419 |
| 2005/0060574 A1 * | 3/2005 | Klotz | ................. | H04L 41/22 726/4 |
| 2005/0108444 A1 * | 5/2005 | Flauaus | ................. | H04L 41/0853 710/15 |
| 2005/0172018 A1 * | 8/2005 | Devine | ................. | G06F 11/0709 709/223 |
| 2005/0188221 A1 * | 8/2005 | Motsinger | ................. | G06F 21/55 726/5 |
| 2006/0242282 A1 * | 10/2006 | Mullarkey | ................. | H04L 41/5003 709/223 |
| 2006/0271677 A1 * | 11/2006 | Mercier | ................. | G06F 16/1824 709/224 |
| 2008/0104230 A1 * | 5/2008 | Nasuto | ................. | G06F 11/3419 709/224 |
| 2008/0126534 A1 * | 5/2008 | Mueller | ................. | G06F 11/3409 709/224 |
| 2011/0126111 A1 * | 5/2011 | Gill | ................. | G06F 21/55 715/736 |
| 2012/0101800 A1 * | 4/2012 | Miao | ................. | G06F 11/3612 703/22 |
| 2013/0211559 A1 * | 8/2013 | Lawson | ................. | G06Q 10/06315 700/83 |
| 2013/0212257 A1 * | 8/2013 | Murase | ................. | H04L 43/00 709/224 |
| 2014/0173675 A1 * | 6/2014 | Ahmed | ................. | H04N 5/23206 725/116 |
| 2014/0215058 A1 * | 7/2014 | Vicat-Blanc | ................. | H04L 43/045 709/224 |
| 2015/0081880 A1 * | 3/2015 | Eaton | ................. | H04L 47/785 709/224 |
| 2015/0288682 A1 * | 10/2015 | Bisroev | ................. | G06F 3/0481 713/172 |
| 2015/0295780 A1 * | 10/2015 | Hsiao | ................. | H04L 43/022 715/736 |
| 2015/0295796 A1 * | 10/2015 | Hsiao | ................. | H04L 41/0813 715/738 |
| 2015/0358391 A1 * | 12/2015 | Moon | ................. | H04L 67/10 709/224 |
| 2016/0094431 A1 * | 3/2016 | Hall | ................. | G06F 16/282 709/224 |
| 2016/0105335 A1 * | 4/2016 | Choudhary | ................. | G06F 16/284 709/224 |
| 2016/0182399 A1 * | 6/2016 | Zadka | ................. | H04L 47/726 709/226 |
| 2017/0041386 A1 * | 2/2017 | Bhat | ................. | G06F 9/50 |
| 2017/0134481 A1 * | 5/2017 | DeCusatis | ................. | H04L 47/76 |
| 2018/0041408 A1 * | 2/2018 | Dagum | ................. | H04W 24/10 |

OTHER PUBLICATIONS

V. Catania et al., PMT: A Tool to Monitor Performances in Distributed Systems, 1994 IEEE (Year: 1994).*

Feng Liu et al., Monitoring of Grid Performance Based-on Agent, 2007 IEEE (Year: 2007).*

David Davis. VMware Blogs. http://blogs.vmware.com/management/2014/04/david-davis-on-vcenter-operations-post-8-understanding-vcenter-operations-badges.html. David Davis Blog posted Apr. 29, 2014.

Peter Sevcik. Apdex Alliance. May 24, 2014. http://www.apdex.org/.

* cited by examiner

100

200

300

DISTRIBUTED NETWORK SERVICE RISK MONITORING AND SCORING

CROSS REFERENCE TO OTHER APPLICATIONS

This application claims priority to U.S. Provisional Patent Application No. 62/209,808 entitled HEALTH SCORE filed Aug. 25, 2015 which is incorporated herein by reference for all purposes.

BACKGROUND OF THE INVENTION

Servers provide data and services to client devices. For example, a data center comprising a plurality of servers may service clients over a network. For various reasons, servers and data centers may be subject to performance degradations. A conventional server monitor typically monitors traffic going through the server and reports on a current operational state of the server such as whether server applications are up and/or response times of the server applications. Conventional monitors typically do not analyze the traffic and service characteristics to provide information about health of a group of servers or provide warnings about the server. Thus, there is a need for a server monitoring system that provides a holistic report of server health and provides warnings about changes to server health.

BRIEF DESCRIPTION OF THE DRAWINGS

Various embodiments of the invention are disclosed in the following detailed description and the accompanying drawings.

DETAILED DESCRIPTION

Figure 1:
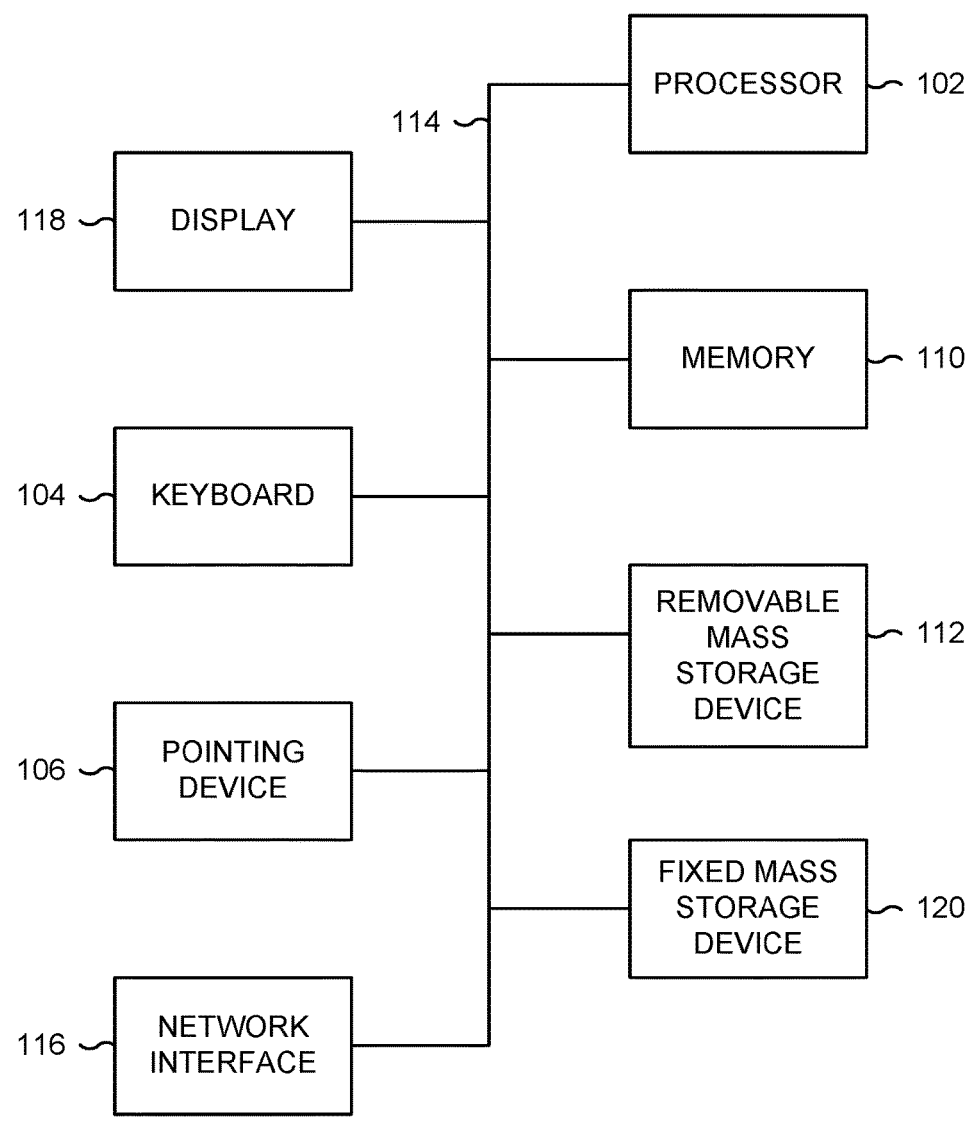
FIG. 1 is a functional diagram illustrating a programmed computer system for scoring health of one or more servers in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional server monitors typically measure server performance but do not determine risks associated with a server (e.g., a server application) or provide a warning about the risks. For example, a server may appear to be healthy because it is able to serve requests at its expected performance levels (e.g., 1000 connections per second with latencies below 100 ms). However, the server may imminently become unhealthy or may crash due to resource depletion such as the server being about to run out of CPU or memory resources. Conventional server monitors typically do not collect and/or determine sufficient information about the overall health of a server. For example, conventional server monitors often determine an operational status and a server's latency or performance, but this information alone is insufficient to provide a holistic report of the server's health. Thus, conventional server monitors do not warn about health changes, some of which may cause a server or group of servers to function sub-optimally.

Techniques of the present disclosure provide a health manager that tracks and determines a condition of a distributed network service environment by combining application performance measurements and health risks. For example, the health manager determines and combines a quality of performance, operational status, resources, security, and consistency to generate a health indicator. In some embodiments, the health indicator (e.g., a single-value score) represents the overall condition of the server(s)/application. The health score not only reflects a current performance of the application and whether the application is meeting service level agreements ("SLAs") but also measures risks across a stack that may ultimately degrade the condition and health of the application.

Figure 3:
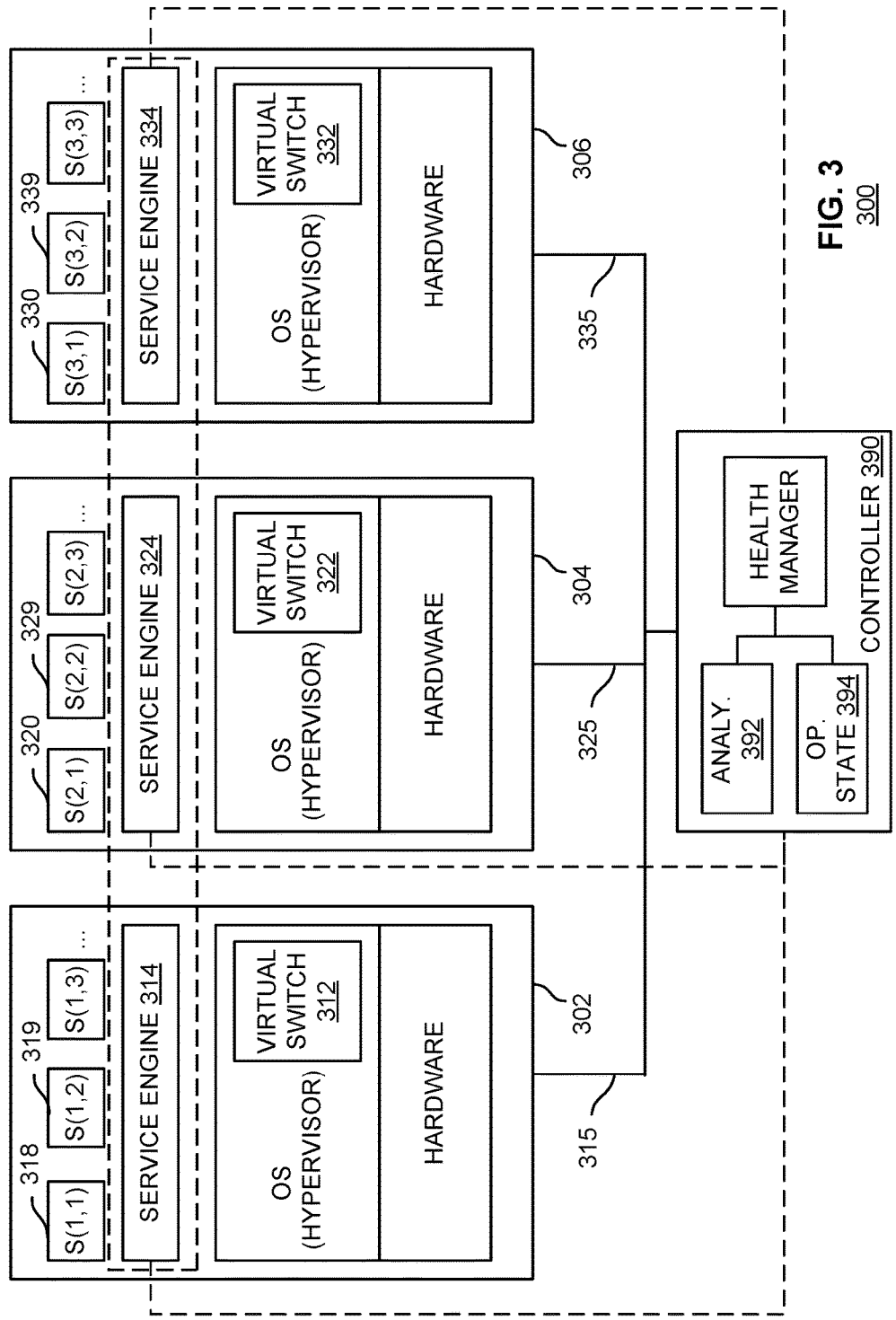
FIG. 3 is a block diagram illustrating an embodiment of a system 300 that includes a health manager.
Figure 4:
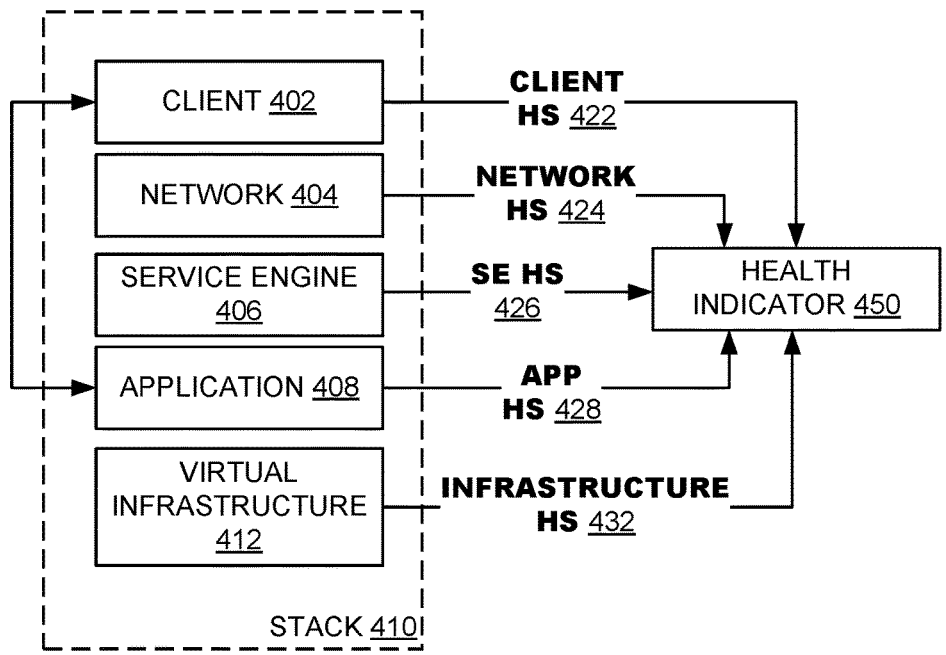
FIG. 4 is a conceptual diagram illustrating an example embodiment of a stack and corresponding metrics for generation of a health indicator.

The techniques described herein find application in a variety of network settings including a distributed network service environment. FIG. 3, which is further described herein, is an example of a distributed network service environment. A distributed network service environment can include a plurality of associated sources (also referred to as "stacks"). FIG. 4, which is further described herein, shows an example of a stack. In some embodiments, a stack includes one or more service engines and a plurality of servers. The plurality of servers are configured to provide a distributed application, and the one or more service engines are configured to provide the plurality of servers with a network service and collect at least a part of the plurality of performance metrics.

In some embodiments, a method of evaluating health of a distributed network service environment is provided. The method includes determining an application performance measurement based at least in part on a plurality of performance metrics associated with a plurality of sources. The method includes determining a health risk of the distributed network service environment based at least in part on a plurality of risk parameters. The method includes combining the application performance measurement and the health risk of the distributed network service environment to determine a health indicator. If the health indicator indicates a health change of the distributed network service environment, the method generates a notification of the health change of the distributed network service environment.

FIG. 1 is a functional diagram illustrating a programmed computer system for scoring health of one or more servers in accordance with some embodiments. As will be apparent, other computer system architectures and configurations can be used to perform health scoring. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide a health manager described below in connection with FIG. 3.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

An optional removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An optional auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer-readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
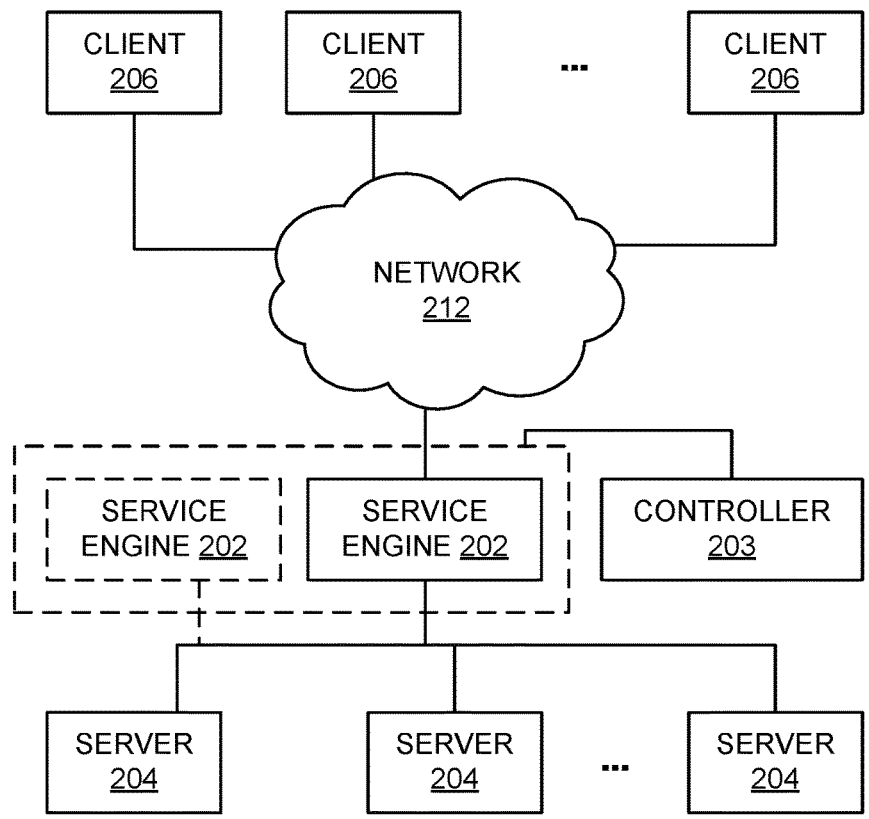
FIG. 2 is a block diagram illustrating an embodiment of a system that includes a health manager.

FIG. 2 is a block diagram illustrating an embodiment of a system 200 that includes a health manager. System 200 includes one or more clients 206, network 212, one or more service engines 202, a controller 203, and one or more servers 204.

Client 206 accesses data, services, and/or applications (collectively referred to as "services" hereinafter) provided by a server. Examples of a client include a laptop computer, a desktop computer, a smartphone, a tablet computer, a wearable computer, or any other networked device.

Service engine 202 provides a network function or service. In the embodiment shown in FIG. 2, system 200 includes a plurality of service engines to provide a distributed network function or service. That is, a distributed network function or service is carried out by one or more instances of a service engine in cooperation. By way of a non-limiting example, network function and/or services include load balancing, proxying, authorization, content acceleration, analytics, application management, and security (e.g., providing a firewall, providing an intrusion prevention system, providing an intrusion detection system, handling denial of service attacks, etc.). These services are collectively referred to as "network-oriented services" hereinafter and may include any combination of network functions and/or services. A service engine may be implemented as a load balancer, a firewall, etc.

Servers 204 host data, services, and/or applications. In some embodiments, the content hosted by the servers is accessible by client 206 via network 212. By way of a non-limiting example, the server is a web server or a payment server. In some embodiments, the server executes on a virtual machine or a container as further described herein with respect to FIG. 3. As further described herein, performance of one or more servers is measured by controller 203. Each server of servers 204 may be implemented by one or more physical devices and/or processors.

Controller 203 manages operations of system 200 to determine and track the health of one or more servers 204. In some embodiments, controller 203 is configured to perform the techniques further described herein to determine a health indicator, e.g., in relation to FIGS. 6A-6C. In some embodiments, controller 203 includes a management network external to one or more service engines 202. In some embodiments (not shown), system 200 includes a cluster of controllers to provide management of the service engines. That is, distributed management is carried out by one or more instances of a controller in cooperation. Controller 203 may be implemented by one or more physical devices and/or servers. Controller 390 shown in FIG. 3 is an example of controller 203.

Network 212 facilitates communications between components of system 200. Examples of network 212 include one or more of the following: a direct or indirect physical communication connection, a mobile communication network, a wireless network, the Internet, an intranet, a Local Area Network, a Wide Area Network, a Storage Area Network, a hybrid network, and any other form of communication connecting two or more systems, components, or storage devices together. Other communication paths may exist and the example shown has been simplified to illustrate the example clearly. The connections between the components shown in FIG. 2 may be a wired connection, a wireless connection, and/or software data communication paths. Although limited instances of components are shown in the example to simplify the diagram, additional instances of any of the components shown in FIG. 2 may exist. Components not shown in FIG. 2 may also be included. For example, networking components such as switches, routers, gateways, management devices, etc. have not been shown to simplify and illustrate the embodiment more clearly.

In operation, client 206 is configured to access services provided by server 204 via network 212. In this example, one or more services are provided by a pool of servers 204. One or more service engines 202 are configured to intercept traffic and provide various network-oriented services. A controller 203, which includes a health manager, is configured to perform various management functions such as monitoring system metrics and/or events, performing analytics on detected metrics and/or events, determining a health score, etc.

FIG. 3 is a block diagram illustrating an embodiment of a system 300 that includes a health manager. In this example, platform 300 includes a number of devices (e.g., multiple server computers or a multicore server comprising multiple processing cores). A physical device (e.g., 302, 304, 306, etc.) has hardware components and software components, and may be implemented using a device such as system 100. Separate physical devices communicate with each other via communication interfaces such as ports, wireline or wireless network interface cards, etc. Although three systems are shown for purposes of illustration, the number of systems and the number of components within each system can vary in other embodiments.

In some embodiments, the devices include virtual machine (VM)-based systems. In a VM-based system, a number of virtual machines (VMs) such as 318, 319, etc. are configured to execute on the same device such as 302. A VM is a software implementation of a machine (e.g., a computer) that simulates the way a physical machine executes programs. Each VM executes its own operating system. Within the operating system, services are configured to execute as they would on a standard non-VM-based system. The part of the device's operation system that manages the VMs is referred to as the hypervisor. The hypervisor interfaces between the physical hardware and the VMs, providing a layer of abstraction for the VMs. Through its management of the VMs' sharing of the physical hardware resources, the hypervisor makes it appear as though each VM were running on its own dedicated hardware. Examples of hypervisors include VMware Workstation® and Oracle VM VirtualBox®.

In some embodiments, the devices include container-based systems. In a container-based system, multiple containers such as 318, 319, etc. are configured to execute on the same device such as 302, within the same operating system. Each container functions as a lightweight VM that can execute other programs. Examples of container-based systems include Kubernetes, Docker, Mesos, etc.

In some embodiments, the devices include a combination of VM-based systems, container-based systems, and/or standard systems (e.g., non-VM-based systems and/or non-container-based systems).

In this example, clients (not shown) communicate with servers, which are configured to execute within VMs or containers to provide services (also referred to as target applications). Examples of such services include a website service, a shopping cart application, user authentication, credit card authentication, email service, file sharing service, virtual desktop, voice/video streaming, online collaboration, etc. Many other services can be implemented. A server (e.g., a web server, a credit card processing server, a database server, etc.) executes within a VM or container to provide a service, and multiple servers can execute on multiple VMs to provide the same service. For example, three separate servers execute within VMs or containers 318, 320, and 330 to provide the $1^{st}$ service; three separate servers execute within VMs or containers 319, 329, and 339 to provide the $2^{nd}$ service; etc.

In the example shown, inside the operating system, there are multiple modules providing different functionalities. One of the modules is a virtual switch (312, 322, 332, etc.). A physical device hardware has one or more physical ports (e.g., Ethernet ports). Network traffic (e.g., data packets) can be transmitted or received by any of the physical ports, to or from any VMs or containers. The virtual switch is configured to direct traffic to and from one or more appropriate VMs or containers, such as the VM or container in which the service engine on the device is operating.

Service engines 314, 324, and 334 (also referred to as SE1, SE2, and SE3, respectively) are instantiated on physical devices 302, 304, and 306, respectively. In some embodiments, a service engine is implemented as software executing in a virtual machine or container. The service engine is executed to provide distributed network services for processes executing on the same physical server as the service engine as well as for processes executing on different physical servers. Multiple service engines are configured to cooperate and provide the distributed network services. In some embodiments, the service engine is configured to enable appropriate service components that implement service logic. When a specific service is desired, a corresponding server is configured and invoked by the service engine to execute in a VM. In this example, the servers are denoted as S(i, j), where i represents the service engine identifier and j represents the service identifier. Thus, S(1, 1) indicates that the server corresponds to SE1 and the $1^{st}$ service, S(2, 1) indicates that the server corresponds to SE2 and the $1^{st}$ service, etc. The service engine also gathers operational data for the services (e.g., numbers of open connections for the $1^{st}$ service maintained by servers S(1, 1), S(2, 1), and S(3, 1), respectively; number of requests made to servers S(1, 1), S(2, 1), and S(3, 1), respectively; etc.). Note that the number of instances of servers providing a particular service can vary; for example, there can be multiple servers providing the $1^{st}$ service on device 304 (in other words, multiple S(2, 1)'s can execute in multiple VMs on device 304).

A virtual switch such as 312 interacts with the service engines, and uses existing networking Application Programming Interfaces (APIs) (such as APIs provided by the operating system) to direct traffic and provide distributed network services for services deployed on the network. The operating system and the services implement the networking API calls (e.g., API calls to send data to or receive data from a specific socket at an Internet Protocol (IP) address). In some embodiments, the virtual switch is configured to be in-line with one or more VMs or containers and intercepts traffic designated to and from instances of the services executing on the VMs or containers. When a networking API call is invoked, traffic is intercepted by the in-line virtual switch, which directs the traffic to or from the appropriate VM on which instances of the service execute. In some embodiments, a service engine sends data to and receives data from a server via the virtual switch.

Traffic received on a physical port of a server (e.g., a communications interface such as Ethernet port 315) is sent to the virtual switch (e.g., 312). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application.

In some embodiments, the service engines cooperate to provide distributed network-oriented services. Using the example of load balancing, when a request for the $1^{st}$ service is received on interface 315, 325, or 335, the request is forwarded by virtual switch 312, 322, or 332 to service engines 314 (SE1), 324 (SE2), or 334 (SE3), respectively. Each service engine determines, based on current load balancing conditions (e.g., number of open connections handled by each server) and preconfigured load balancing rules (e.g., the number of open connections handled by each server should be approximately the same), whether the request should be serviced by server S(1,1), S(2,1), or S(3,1). In other words, each service engine can distribute the request across physical device boundaries (via the virtual switch and the physical interface such as the networking interface) to any server providing the desired service.

In some embodiments, the service engines gather operational data associated with each server, such as current number of open connections for a service associated with each server, average number of requests/second, average connections/second, maximum number of open connections over a period of time, latency, average response time, etc. Many other types of operational data including health data can be collected. In some embodiments, health data can be derived from collected operational data. Details of how the virtual switch and the service engine interact to handle traffic, collect operational data, and determine a health indicator are described below in FIGS. 6A-6C.

A controller 390 is configured to control, monitor, program, and/or provision the services, virtual machines, and/or containers. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, collecting analytics information, and/or determining health indicator changes. The controller can be implemented as software, hardware, firmware, or any combination thereof. In this example, controller 390 includes a health manager configured to determine a health score of one or more servers. As will be described in greater detail below, the health manager obtains the operational data from the service engines, determines application performance measurements and health risks from the operational data, and combines application performance measurements and health risks to determine whether there is a change in health.

In this example, controller 390 includes analytics module 392 and operational state module 394. Analytics module 392 receives and aggregates operational data from one or more service engines and identifies patterns in the operational data according to metrics. Operational state module 394 receives and aggregates operational data from one or more service engines to determine an operational state of the service engine(s). The health manager receives the result of the processing by analytics module 392 and operational state module 394 and determines a health score therefrom.

The modules described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

The health indicator is computed using metrics across the stack (also referred to as "source") for each of the layers of the stack. FIG. 4 is a conceptual diagram illustrating an example embodiment of a stack and corresponding metrics for generation of a health indicator. In the example shown in FIG. 4, stack 410 includes client layer 402, network layer 404, service engine layer 406, application layer 408, and virtual infrastructure layer 412. Client layer 402 includes one or more client devices to access services provided by a server. Client 206 is an example of a client. Network layer 404 may include one or more network devices forming a platform for communications between layers of stack 410. Examples of network devices include routers, switches, or other appropriate devices providing networking functions. Service engine layer 406 provides a network function or service. The service engine layer 406 may include one or more service engines and be implemented by an application delivery controller. Service engine 202 of FIG. 2 is an example of a service engine. Application layer 408 includes one or more applications hosted by a virtual infrastructure. The application layer may be accessed by one or more service engines to respond to client requests for information. Virtual infrastructure layer 412 hosts data, services, and/or applications. Server 204 of FIG. 2 is an example of a virtual infrastructure. The layers shown in FIG. 4 are for illustrative purposes and other layers are also possible. In some embodiments, the client and application are communicatively coupled.

In operation, the client makes requests to the application, which the application services by services hosted by virtual infrastructure 412. The quality and characteristics by which the request is serviced indicate health of each of the layers of stack 410. For example, a request may take abnormally long to be serviced. The reason for this delay may be due to one or more layers in the stack. In other words, an overall user experience is defined by the quality of performance provided by each layer, where the quality of performance for each layer is measured and represented by a respective metric. The reason for the delay can be determined according to the techniques described herein and conveyed by a health indicator. The health indicator, which is a combination of constituent metrics for at least some of the layers, may indicate the reason for the degradation in performance.

Performance of each of the stack components is measured by a respective health metric, which is shown as client HS 422, network HS 424, service engine HS 426, application HS 428, and infrastructure HS 432. These component health scores (HS) are aggregated to produce a health indicator 450. The component health scores may be aggregated according to the techniques further described herein, e.g., with respect to FIGS. 6A-6C.

The health indicator provides information about where problems are in the application stack or infrastructure layer. For example, the health indicator indicates to an administrator which layer of the application's stack has problems and allows the administrator to more quickly identify and resolve the problem. In some embodiments, the aggregated application health indicator is a single value with encoded information about the location (e.g., layer) of a problem that lowers performance quality. For example, a particularly low component health score (with respect to a threshold value) indicates a problem in that area. Suppose there is a loss of power in the network for a period of time. The network health score 424 is lowered due to the blackout. Thus, the network health score component of the overall application health will appear lower than a threshold. When the health indicator is provided, the network health score will appear lower and indicates to the administrator that the network system should be investigated to resolve any evolving/lingering issues from the blackout.

Figure 5:
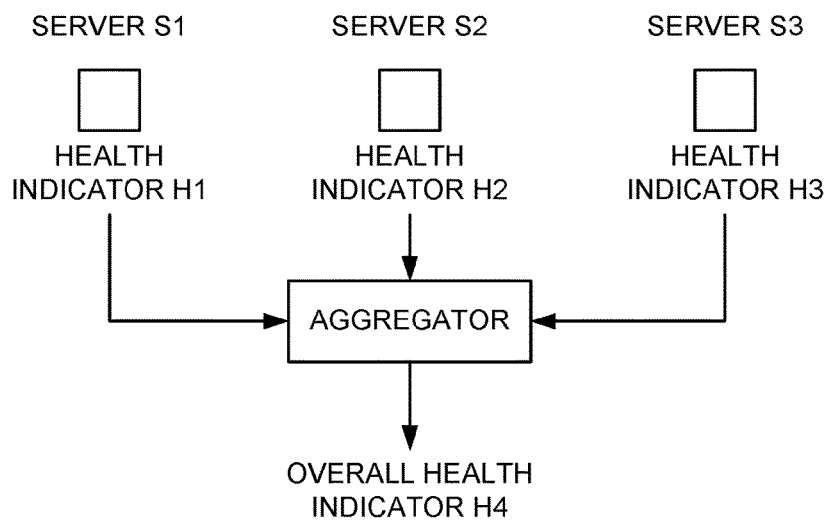
FIG. 5 is a conceptual diagram illustrating an example embodiment of health indicator generation for a plurality of servers.

FIG. 5 is a conceptual diagram illustrating an example embodiment of health indicator generation for a plurality of servers. In some embodiments, an overall health indicator indicates the condition of multiple instances of servers and is given by an aggregation of respective health indicators for various servers. As shown in the example of FIG. 5, an individual health score is calculated for each server. Health indicator H1 corresponds to server S1, health indicator H2 corresponds to server S2, and health indicator H3 corresponds to server S3. These health scores H1-H3 are aggregated by an aggregator to produce an overall health indicator H4. The aggregation can be performed according to various functions such as minimum, maximum, and average. Overall health indicator H4 indicates an overall quality of server for a collection of servers S1-S3. By contrast, conventional measures of server performance typically do not produce overall measures of the performance of a group of servers.

Figure 6B:
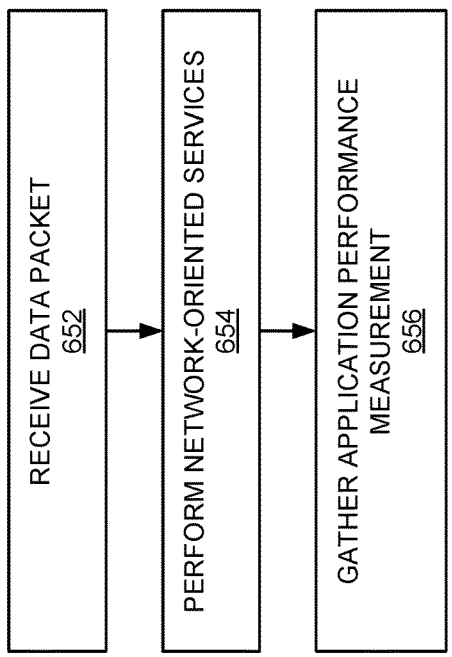
FIG. 6B is a flowchart illustrating an example embodiment of a process for gathering an application performance measurement.
Figure 6C:
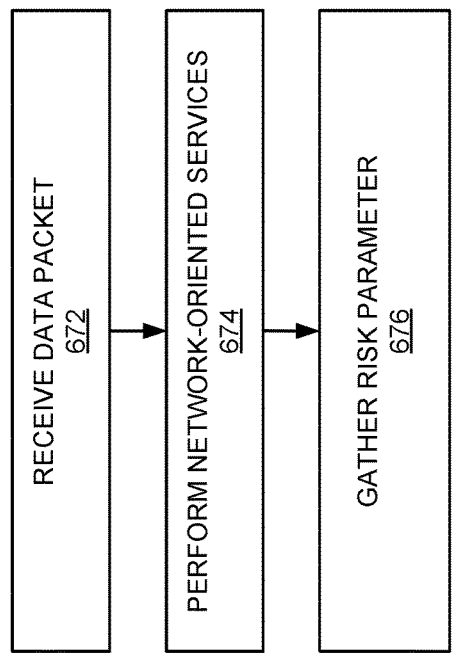
FIG. 6C is a flowchart illustrating an example embodiment of a process for gathering a risk parameter.
Figure 6A:
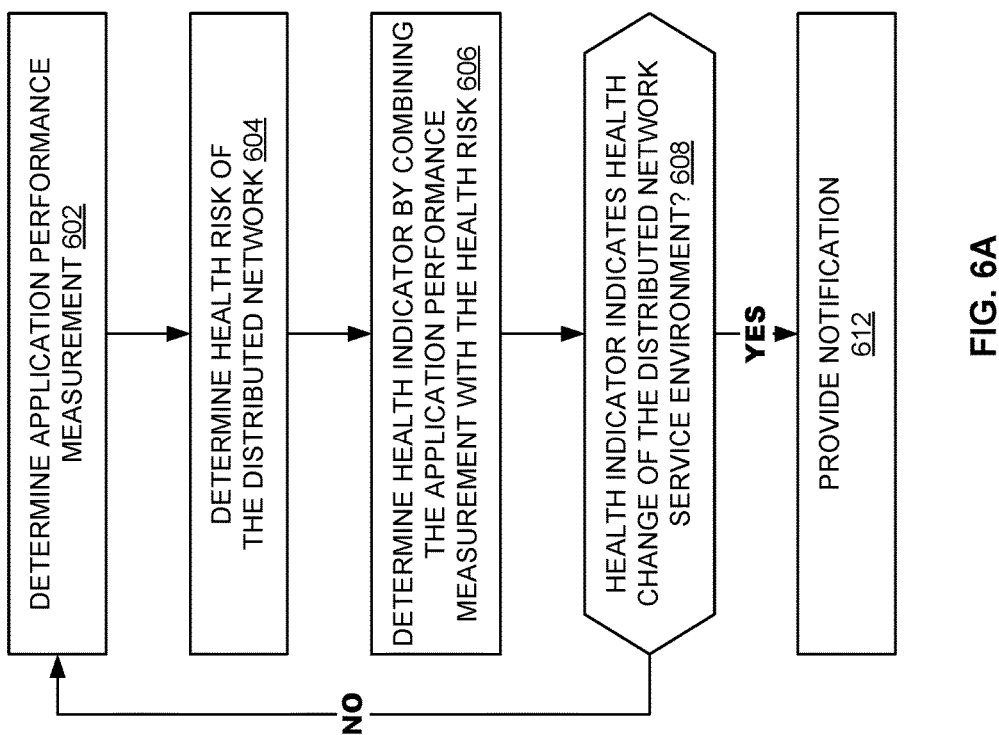
FIG. 6A is a flowchart illustrating an example embodiment of a process for determining a health indicator.

FIG. 6A is a flowchart illustrating an example embodiment of a process for determining a health indicator. The process can be performed by a processor. The processor can be embodied in a device such as processor 102 shown in FIG. 1, controller 203 shown in FIG. 2, and/or controller 390 shown in FIG. 3.

At 602, an application performance measurement is determined. In some embodiments, the application performance measurement is determined while a service engine performs a network-oriented service. In some embodiments, the service engine polls servers to obtain operational data to make the application performance determination. FIG. 6B shows an example process for determining an application performance measurement. The application performance measurement is also referred to as a performance score. The performance score is a measurement of a quality of service provided by one or more servers. In various embodiments, the performance score is an aggregation of the quality of service provided by multiple instances of servers in a system. The performance score is further described herein.

At 604, a health risk of the distributed network is determined. In some embodiments, the health risk is determined based on risk parameters. A health risk is a measurement of factors that impair the quality of service provided by the one or more servers. For example, high CPU or resource utilization makes the servers less effective and may lower performance quality or health of a system. By way of a non-limiting example, a health risk includes resource penalties, security penalties, and consistency penalties. In some embodiments, risk parameters are obtained while a service engine performs a network-oriented service. In some embodiments, the service engine polls servers to obtain operational data and determines risk parameters therefrom. FIG. 6C shows an example process for determining risk parameters. Each of the resources, security, and consistency penalties are further described herein.

At 606, a health indicator is determined by combining the application performance measurement with the health risk. The health indicator is also referred to as a health score. A health score reflects a state of one or more servers, e.g., quality of service provided by the servers at a particular time. In some embodiments, a health score indicates the condition of multiple instances of servers. In some embodiments, the health score is given by:

$$\text{Health Score} = \text{Application Performance Measurement} - \text{Health Risk} \quad (1)$$

The scaling of the health score can be predefined. Using an example scale of 0-100, a health score of 100 indicates that the performance of all layers in the application stack including the infrastructure layer (taking into account the health risk) is in good condition.

The health score can be provided as a single value. From the single value, inferences can be drawn about health. For example, a health score can be classified based on its value as poor, average, or good. Using the example of a classification scheme in which 90-100 is good service, a health score of 90 indicates that around 90% of users are receiving good service. The health score indicates whether SLAs are being met, resource exhaustion/consumption, security, consistency/predictability, etc. As further described herein, the breakdown of how the health score is obtained (e.g., application performance measurement and health risk) indicates a source of a problem. For example, a particularly high penalty indicates a reason or problem area causing a health change.

Figure 11:
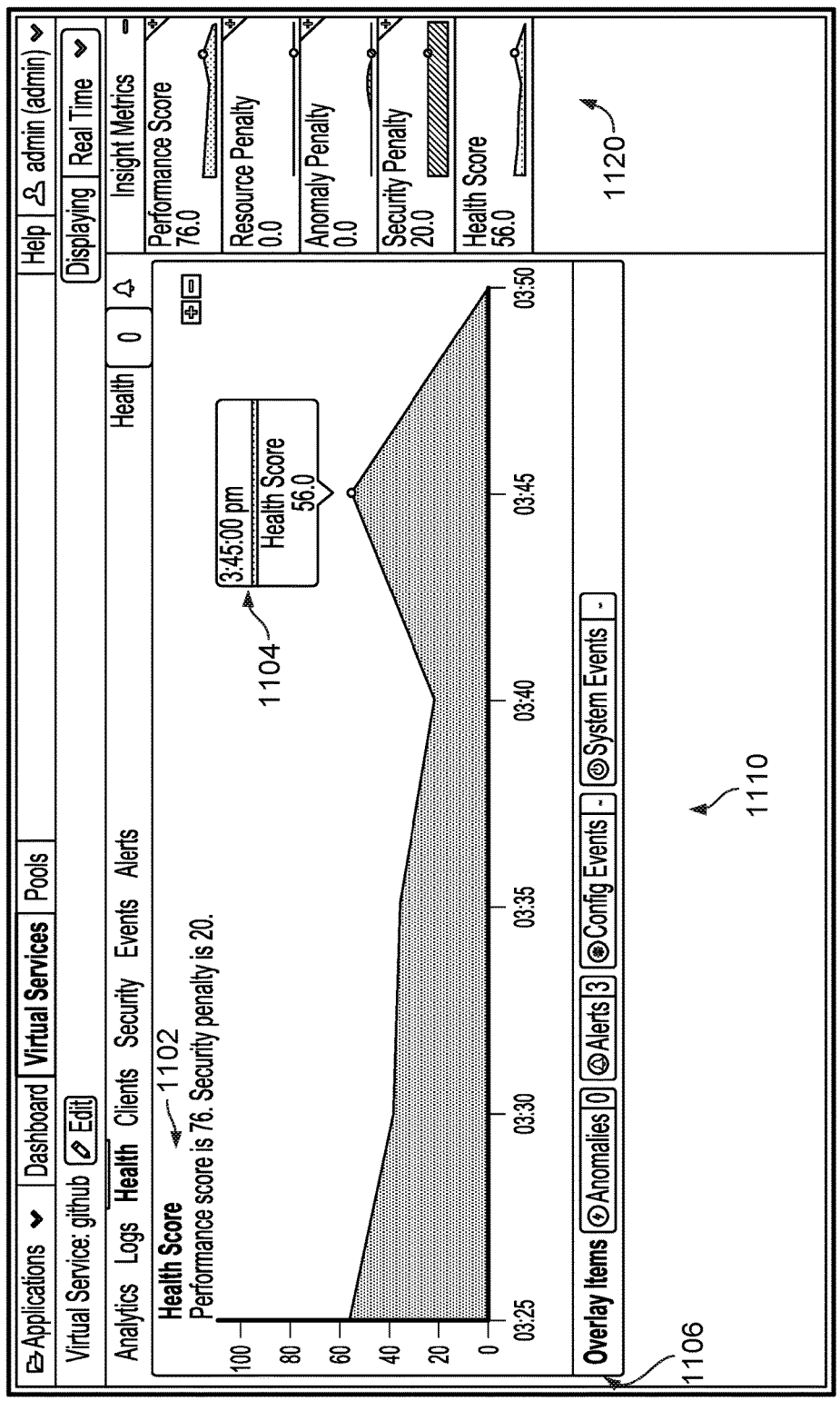
FIG. 11 is an example user interface displaying a health indicator.
Figure 12:
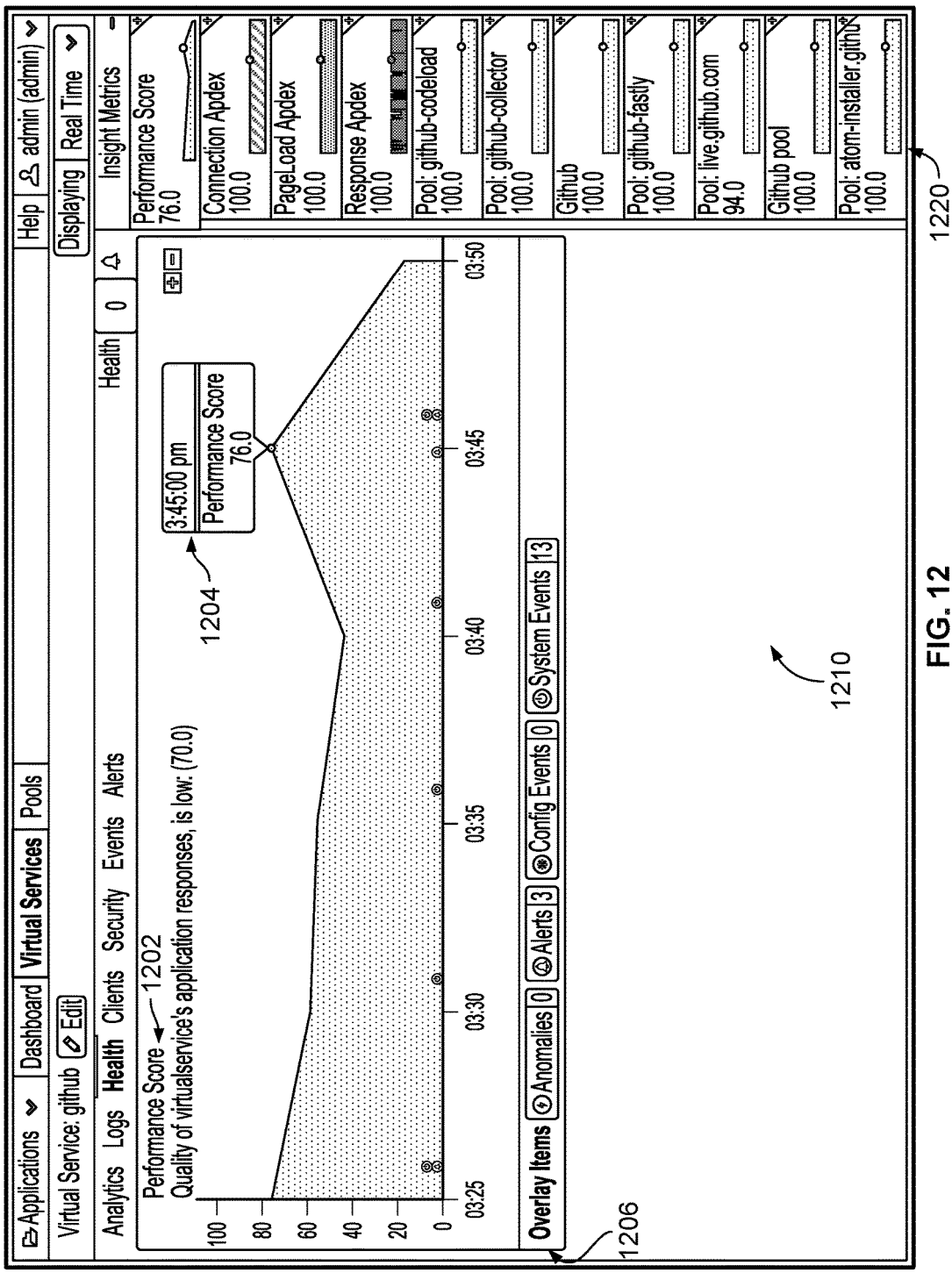
FIG. 12 is an example user interface displaying a performance score.
Figure 13:
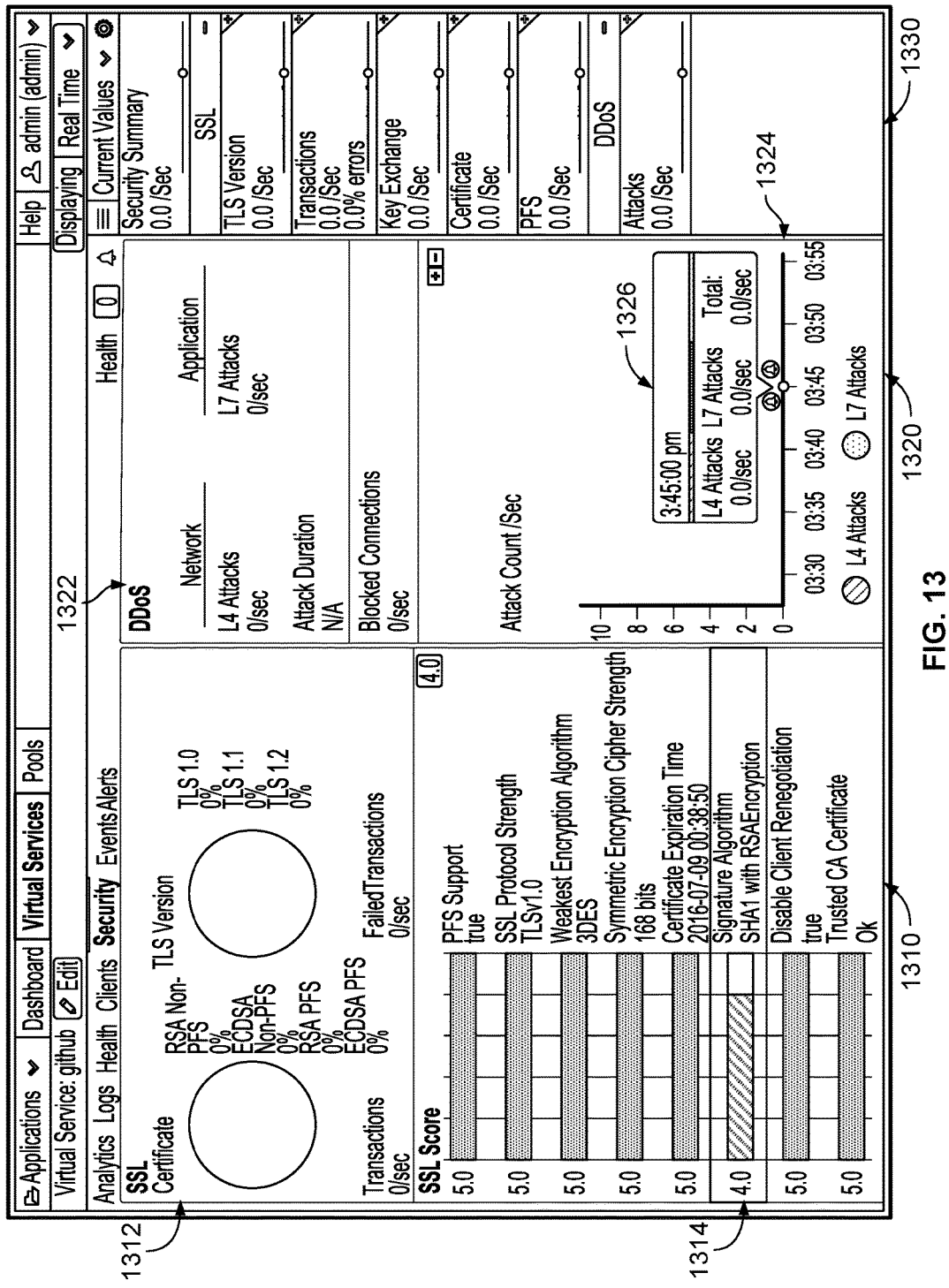
FIG. 13 is an example user interface displaying a security summary.

At 608, it is determined whether the health indicator indicates a health change of the distributed network service environment. If a health change is indicated, a notification is provided at 612. The notification may be provided as output in an application programming interface, rendered on a user interface, etc. FIGS. 11-13 are example user interfaces displaying the notification. If a health change is not indicated, control passes to 602 in which an application performance measurement is determined. The application performance measurement may change over time as network conditions change.

FIG. 6B is a flowchart illustrating an example embodiment of a process for gathering an application performance measurement. The process can be performed by a processor. The processor can be embodied in a device such as processor 102 shown in FIG. 1, service engine 202 shown in FIG. 2, and/or service engine(s) 314, 324, and 334 shown in FIG. 3.

At 652, a data packet is received. The data packet may be received as part of the operation of a distributed network environment. For example, a service engine receives a request from a client for services hosted by the server. As another example, a service engine receives a response to be relayed from the server to a requesting client.

At 654, network-oriented services are performed. The network-oriented services may be performed in response to the receipt of the data packet. For example, a service engine provides network-oriented services by processing packets during load balancing. As another example, when a service engine processes packets during load balancing, operational data is stored for application performance measurement determination. The operational data is used to determine the application performance measurement. The determination of the application performance measurement can occur concurrently with or after the operational data has been gathered.

At 656, an application performance measurement is gathered. Application performance measurements may be gathered in a variety of ways. For example, headers are checked and logged, packet size is determined, response time is tracked, server instances are recorded, and the like. For example, while processing packets during load balancing, application performance measurements are gathered. As another example, the application performance measurement is gathered/determined from operational data. In some embodiments, the operational data is at least partly gathered prior to determining the application performance measurement. That is, the application performance measurement is determined based on historical data. In some embodiments, an application performance measurement can be determined substantially simultaneously with the gathering of operational data.

FIG. 6C is a flowchart illustrating an example embodiment of a process for gathering a risk parameter. The process can be performed by a processor. The processor can be embodied in a device such as processor 102 shown in FIG. 1, service engine 202 shown in FIG. 2, and/or service engine(s) 314, 324, and 334 shown in FIG. 3.

At 672, a data packet is received. The data packet may be received as part of operation of a distributed network environment. For example, a service engine receives a request from a client for services hosted by the server. As another example, a service engine receives a response to be relayed from the server to a requesting client.

At 674, network-oriented services are performed. The network-oriented services may be performed in response to the receipt of the data packet. For example, a service engine provides network-oriented services by processing packets during load balancing. As another example, when a service engine processes packets during load balancing, operational data is stored for risk parameter determination. The operational data is used to determine risk parameters. The determination of the risk parameters can occur concurrently with or after the operational data has been gathered.

At 676, a risk parameter is gathered. Risk parameters may be gathered in a variety of ways. For example, a certificate is examined, dropped connections are counted, DDoS attacks are identified and recorded, headers are checked and logged, packet size is determined, response time is tracked, server instances are recorded, infrastructure resource utilization of server instances is measured, and the like. For example, while processing packets during load balancing, risk parameters are gathered. As another example, risk parameters are gathered/determined from operational data. In some embodiments, the operational data is at least partly gathered prior to determining the risk parameter. That is, the risk parameter is determined based on historical data. In some embodiments, a risk parameter can be determined substantially simultaneously with the gathering of operational data.

The application performance measurement is a measurement of performance of a stack. The application performance measurement is also referred to as a performance score. For example, performance of each layer in the stack is scored and the constituent scores are combined to produce an overall performance score. The score of a layer is referred to as a performance metric. In some embodiments, the performance score is given by a lowest value from among the performance metrics:

$$\text{Performance Score}=\min\{\text{Performance Metrics}\} \quad (2)$$

The performance metrics include the set of scores given by layers of a stack. In some embodiments, the set of performance metrics includes a score for each layer of a full stack. Such a set of performance metrics is referred to as "full stack performance metrics." Using the example shown in FIG. 4, full stack performance metrics include the client HS 422, network HS 424, service engine HS 426, application HS 428, and infrastructure HS 432. By taking the minimum of the full stack performance metrics, a problem area (e.g., a lowest score) is highlighted. In various embodiments, the performance metrics are collected by one or more service engines such as service engine(s) 202 shown in FIG. 2, service engine(s) 314, 324, and 334 shown in FIG. 3, or service engine 406 shown in FIG. 4.

In some embodiments, a performance metric includes an application performance index (apdex). An apdex is a measurement of user satisfaction and represents a quality of performance. In some embodiments, an apdex is a standard method for reporting and comparing quality of performance. An example of an apdex can be found at www.apdex.org.

In some embodiments, an apdex is a customized measurement of quality of performance. For example, the apdex classifies performance based on a user's experience as measured against a benchmark. A user's experience is classified as satisfied, tolerated, or frustrated. Other classifications can be used. Using the example of a page load apdex, a satisfied user is one whose page loads within a first threshold length of time. A tolerated (tolerant) user is one whose page loads exceed the first threshold length of time but within a second threshold length of time. A frustrated user is one whose page does not load within the first or second threshold length of time. Using the example of connections, a satisfied user's connection is successful, e.g., the TCP connection is successfully terminated. A tolerated (tolerant) user's connection is lossy, e.g., some retransmissions are made before termination. A frustrated user's connection fails. In one aspect, the apdex measures whether an SLA is met (e.g., satisfied/tolerated experiences meet an SLA while frustrated does not meet the SLA).

In some embodiments, apdex is given by:

$$Apdex = \frac{\text{satisfied} + \frac{\text{tolerated}}{2}}{\text{total samples}} \quad (3)$$

For example, specific types of apdexes include client page load apdex, virtual service apdex, server apdex, network apdex, pool availability apdex, and the like. The client page load apdex is a measure of the time to load a page. In some embodiments, the client page load apdex includes a classification of the response time or the expected effect of the response time on the user (e.g., satisfied, tolerated, frustrated). The virtual service apdex is a measure of performance quality on the client side. For example, the virtual service apdex measures performance quality of network components above service engine 202 (e.g., of client(s) 206) shown in FIG. 2. The server apdex is a measure of performance quality on the server side. For example, the server apdex measures performance quality of network components below controller 203 (e.g., of server(s) 204) shown in FIG. 2. In some embodiments, the virtual service apdex and the server apdex are based on measurements on OSI application layer 7. The network apdex is a measure of performance quality of network components on OSI transport layer 4. For example, the network apdex is based on a number of retransmissions, a zero window size, and the like on OSI transport layer 4. The pool availability apdex is a measure of how many and/or how long servers in a pool of servers have been up (running). For example, the pool availability is given by the number of times within a window of time (or at a particular time) that a server is up.

A resource is a physical quantity such as CPU, memory, queue size, buffer, and the like. A resource can be shared by several physical devices or service engines. An exhausted resource causes degraded performance. In contrast, to conventional indicators based on resource penalties, the present disclosure observes and analyzes resource characteristics to report on the system's health and potential health deterioration in the future.

In some embodiments, a controller polls system components (e.g., stack layers) to determine how much a particular resource is being used. For example, controller 203 queries service engine(s) 202 and/or server(s) 204 for their respective resource utilization. Resource utilization may be reported by system components. For example, a service engine may report a percentage of its CPU usage. Backend servers may report how much disk is used. A router may report router link saturation and/or bandwidth utilization.

The resource utilization is a basis for determining resource penalties. Resource penalties include utilization of computing resources such as CPU, and/or memory, which impact a quality of service and thus are a factor in calculating the health indicator. The resource penalties may be given by a score representing how much a resource is being used, e.g., a percentage of resource being used during a predefined time period. The resource penalties may be given by a flag representing whether a resource is being over-utilized (as defined by a threshold value or percentage of use). In some embodiments, a resource penalty is determined by:

$$\text{Resource Penalty}=\max\{\text{Resource Utilization Metrics}\} \quad (4)$$

The resource utilization metrics include the set of scores given by resources of a stack. In some embodiments, the set of resource utilization metrics includes a score for each resource of a full stack. Such a set of resource utilization metrics is referred to as "full stack performance resource utilization metrics." Using the example shown in FIG. 4, full stack resource utilization includes utilization of network 404 (e.g., router link saturation), utilization of service engine 406, utilization of infrastructure (e.g., server disk space), etc. By taking the maximum of the full stack resource utilization, a problem area (e.g., highest score) is highlighted. The problem area is a resource that is being relatively heavily used compared with other resources. In various embodiments, the resource utilization scores are collected by a controller such as controller 203 shown in FIG. 2 and/or controller 390 shown in FIG. 3.

Resource utilization metrics include server (VM) CPU, memory, disk, resources, physical host resources, network utilization, service engine high availability status, etc. Using the example of service engine high availability status, an application can be configured to have two service engines such that one service engine is a backup for another service engine. If both service engines are being used, then service engine resources are running low and a resource penalty is recorded to reflect the low availability of service engines. Using the example of server (VM) CPU utilization, the utilization is given by an average CPU utilization across servers (e.g., utilization across a pool of virtualized CPUs compared with a host). Using the example of service engine utilization, the resource utilization is a measure of how much a buffer is used. In addition to the examples provided above, any metric or state that reflects resource availability and utilization may be used for calculating resource penalties.

A security penalty is a measure of vulnerabilities that can affect performance quality. For example, the more insecure a system is, the greater the security penalty is (e.g., by assigning a higher security penalty). In some embodiments, the security penalty is computed based on SSL configuration and Distributed Denial of Service (DDoS) attacks. SSL and DDoS are provided as examples of security metrics and other security metrics are also possible. For example, any measure of quality of security can be used as a factor in calculating the security penalty.

Security penalties include security settings/configurations and/or other vulnerabilities, which impact a quality of service and are thus a factor in calculating the health score. A particular security setting such as version of a security protocol used may make one or more servers more or less vulnerable during an attack, causing degradation of service quality. In some embodiments, the security penalty is determined by:

$$\text{Security Penalty} = \text{SSL score} + \max\{\text{DDoS parameters}\} \quad (5)$$

In some embodiments, SSL score is given by min{SSL parameters}. Taking the minimum of the SSL parameters highlights the most vulnerable SSL configuration, as further described herein. Taking the maximum of the DDoS parameters highlights a most severe DDoS attack. For example, an attack may be occurring on a network layer and another attack may be occurring on an application layer. The more severe attack is highlighted by taking the max of the DDoS parameters.

The SSL parameters reflect the settings of the virtual service governing security of communication. By way of a non-limiting example, parameters used to evaluate the SSL score include:
whether perfect forward secrecy (PFS) is supported (e.g., whether keys are vulnerable),
supported SSL protocol versions,
strength of a symmetric key encryption algorithm used,
certificate validity status,
signature algorithm used, and/or
whether a self-signed certificate is used.

Each parameter may be scored based on its strength, e.g., on a scale from 0-5. Using the example of SSL protocol versions, using a 40-bit secret key corresponds to a score of 1 and using a 128-bit secret key corresponds to a score of 3 because a 128-bit secret key is more secure than a 40-bit secret key. In some embodiments, each of the parameters is weighted according to a predefined weight.

The DDoS parameters identify a type of attack being made on a system based on traffic observed by a service engine. The DDoS penalty is adjudicated based on metrics characterizing a DDoS attack. By way of a non-limiting example, parameters that can be used to identify a DDoS attack on the virtual service include:
proportion of received network bytes identified as DDoS bytes,
proportion of received network packets identified as DDoS bytes,
proportion of total bandwidth belonging to DDoS attacks,
proportion of network-layer sessions identified as DDoS attacks,
proportion of application-layer sessions identified as DDoS attacks, and/or
proportion of connections dropped to various policies.

In some embodiments, a DDoS metric is transformed into a value ranging from 0.0 to 5.0 using a function. For example, the value is transformed using a sigmoid function, for example:

$$f(x) = 5.0/(1 + e(-10*(x-0.5))); \text{ for } x \text{ in } [0.0, 1.0] \quad (6)$$

Figure 7:
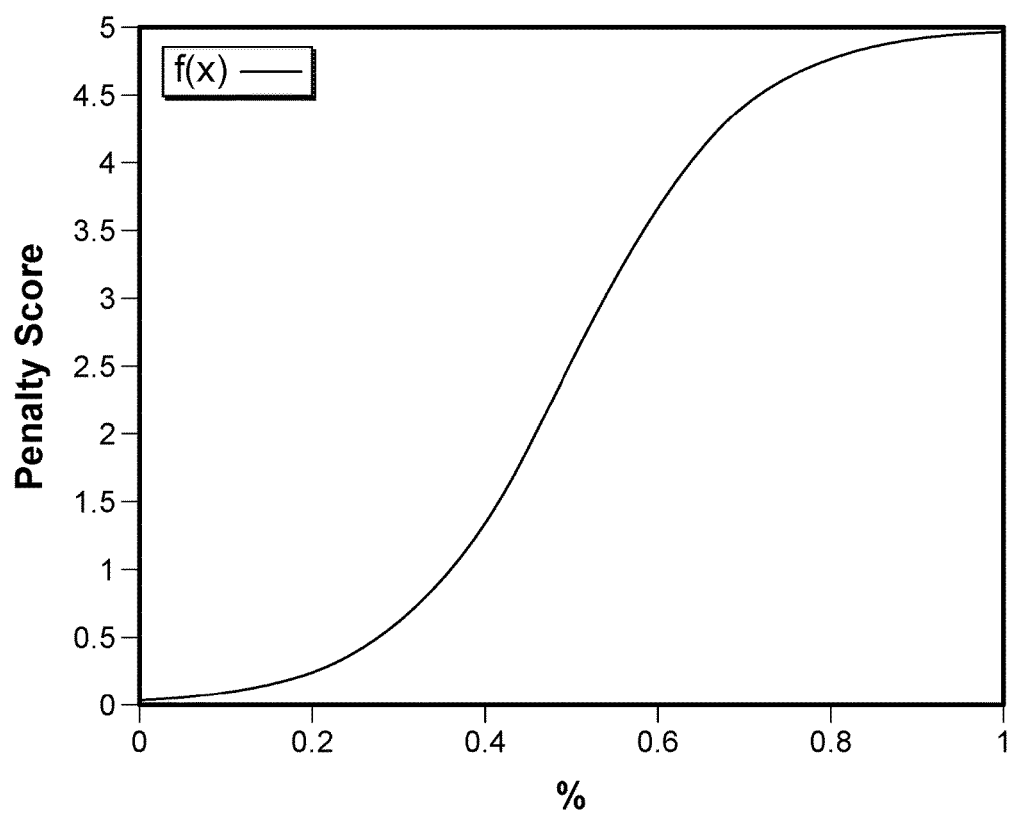
FIG. 7 is an example of a sigmoid function.

FIG. 7 is an example of a sigmoid function, where the x-axis is a percentage (proportion) and the y-axis is a penalty score (using the example scale of 0-5). In some embodiments, the DDoS metric is transformed by the sigmoid function. The transformation draws attention to the more severe attacks. For example, when the proportion is below 0.5, the penalty score is less than 2.5. When the proportion hits 0.6, the penalty score is 3.5. In some embodiments, taking the min of SSL parameters and the max of DDoS parameters from among the various metrics affecting the SSL score and DDoS penalty yields a dominant metric. This information can inform administrators how to find and/or fix problem areas (e.g., security vulnerabilities affecting performance quality). For example, a notification such as the user interface shown in FIG. 13 is provided to the administrator showing aspects of the SSL score and DDoS attacks, as further described herein with respect to FIG. 13.

A consistency penalty is a measure of a statistical deviation from a norm or benchmark for performance/security. For example, a benchmark is set as follows. Suppose an application has CPU resource utilization of 60% for a one-week period in which 99% of the time resource utilization is within 40-70%. In the 1% of the time in which there is an increase in the load and resource utilization becomes 80%, then a deviation from the benchmark has occurred. When many metrics (e.g., measured against a threshold) deviate from their norms/benchmarks, this indicates an unstable system such that the risk to the performance increases. The consistency penalty is determined based on such deviations. A consistency penalty is also referred to as an anomaly penalty. In some embodiments, the anomaly penalty is computed based on a percentage of metrics that are anomalous across different performance, resource, and security metrics across the stack. The number of metrics that shows an anomaly is used as the anomaly penalty. For example, if 30% of metrics show an anomaly, the penalty is 30 points (on a scale of 0-100).

Consistency penalties include irregularities in the provision of the service, which impact a quality of service and are thus a factor in calculating the health score. Consistency penalties are also referred to as anomaly penalties. For example, an anomaly indicates that performance was inconsistent with historical performance, is inconsistent as measured against a threshold, or is not expected to be consistent going forward.

Figure 8:
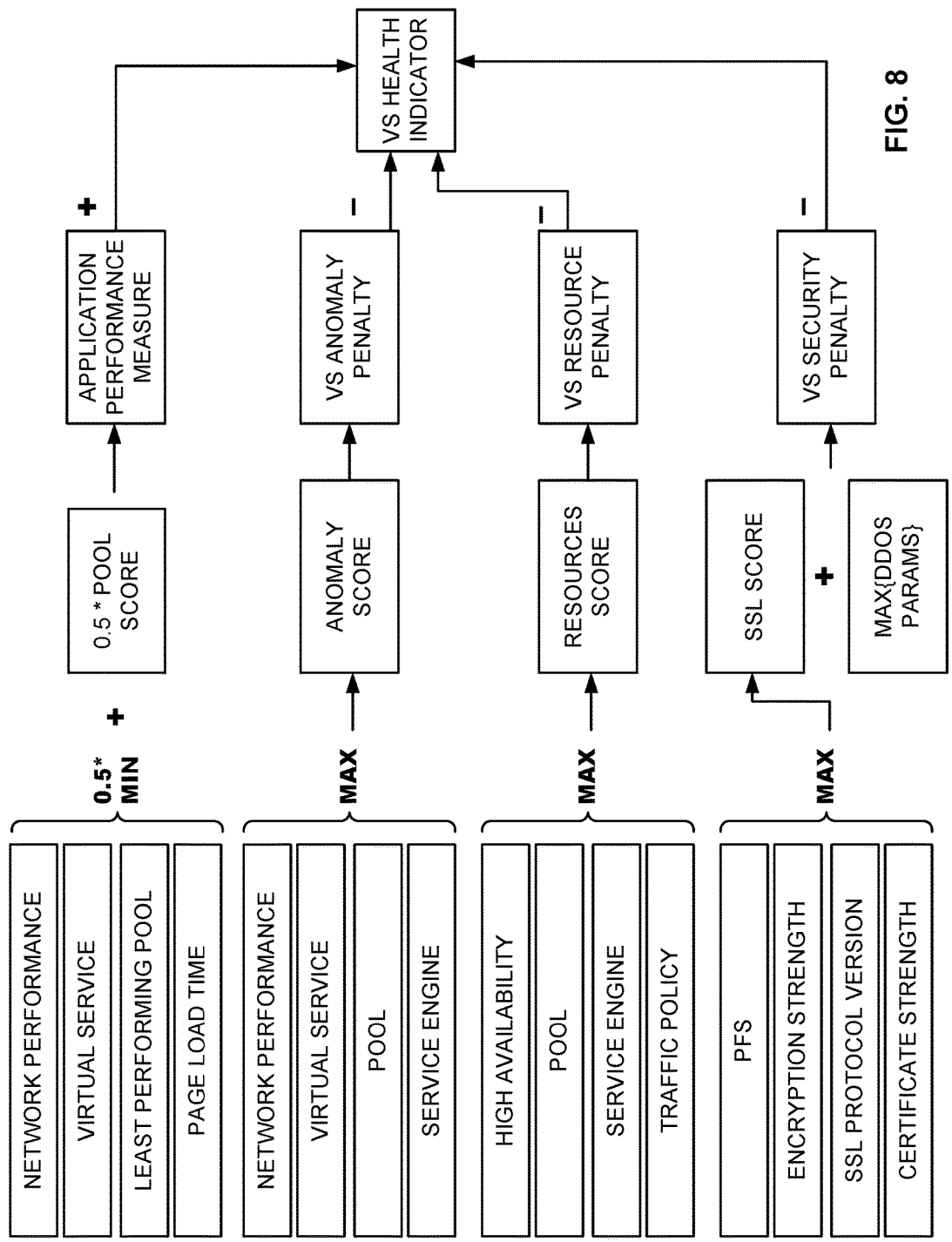
FIG. 8 is a data diagram illustrating an example embodiment of a health indicator determination for a virtual service.

FIG. 8 is a data diagram illustrating an example embodiment of data flow in a health indicator determination for a virtual service. The virtual service health indicator is a measure of the health of one or more virtual servers and reflects the overall health through client, server, application, and infrastructure stack. In the example shown in FIG. 8, the health indicator is given by equation (1), where the application performance measurement is a performance score and the health risk is the sum of an anomaly factor, a resources penalty factor, and a security penalty factor.

Figure 9:
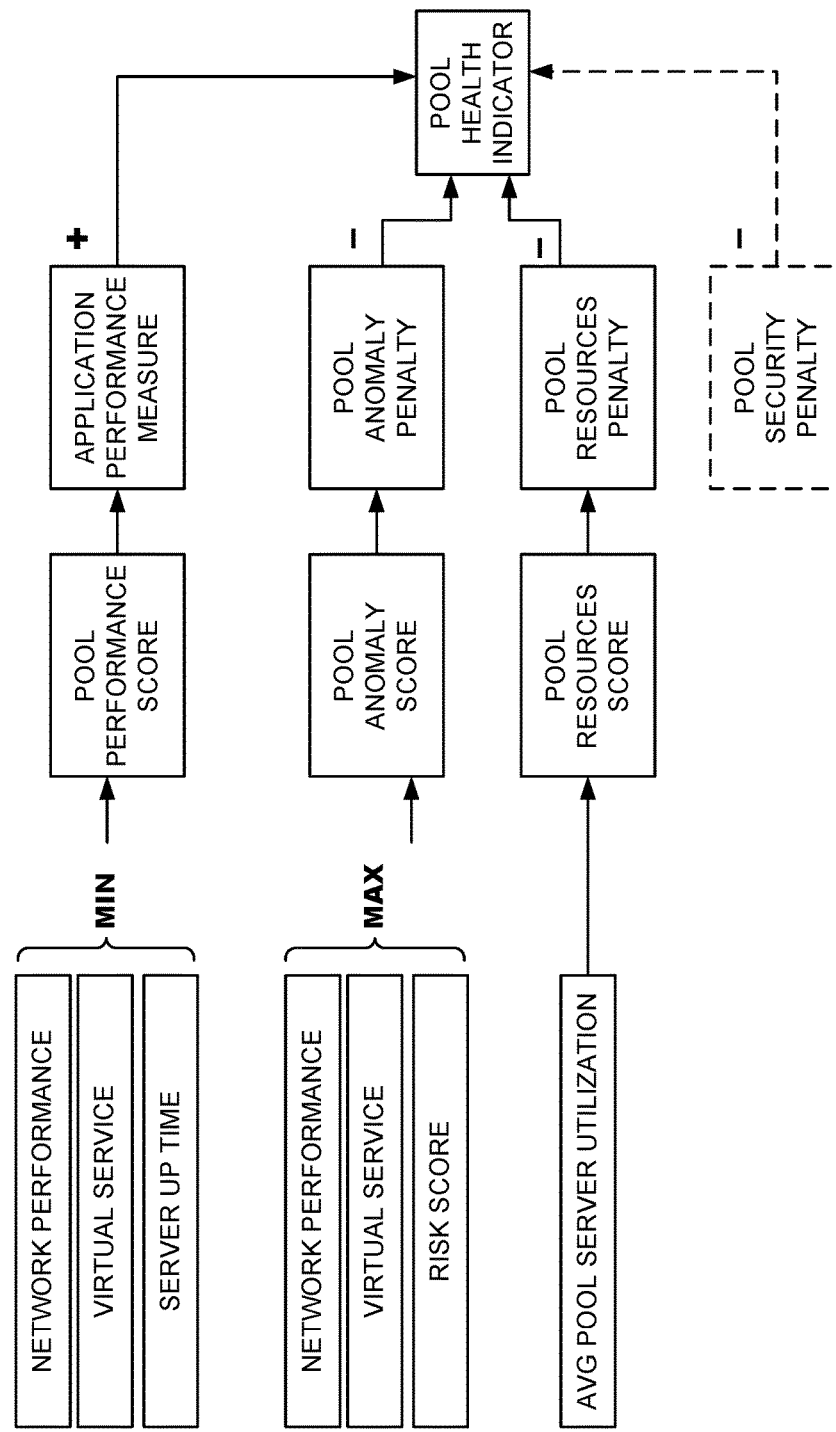
FIG. 9 is a data diagram illustrating an example embodiment of a health indicator determination for pool health.

In this example, the application performance measurement in equation (1) is given by: 0.5*min{performance metrics}+0.5*pool score. The performance metrics include network performance, virtual service (e.g., at an application level), a least performing pool, and a page load time. In some embodiments, an administrator can define a weight for each of the metrics. Each of the performance metrics can include an apdex. For example, the network performance is given by a layer 4 client apdex and the virtual service is given by a layer 7 client apdex. For example, the least performing pool is given by the poorest performer in a pool (e.g., min{pool performance}, where performance is measured by an apdex). For example, the page load time is given by a layer 7 client real user metric. The pool score is a calculation of the overall health of the pool. In some embodiments, the pool health score is calculated based on pool operational metrics such as server user experience. FIG. 9 is an example of pool health score determination. In some embodiments, the performance factor is on a scale of 0-100, where a most healthy rating for performance quality is 100 and a least healthy rating is 0.

In this example, health risk includes the sum of an anomaly factor, a resource penalty factor, and a security penalty factor.

An anomaly factor is given by max{anomaly metrics}. The anomaly metrics include network performance, virtual service (e.g., at an application level), anomalies in a pool, and service engine anomalies where the anomaly metric is a percentage of behavior that is abnormal for the given metric. The service engine anomaly score can be weighted to more accurately reflect a network configuration. For example, where a particular service engine is shared across multiple services, an anomaly on the service engine would be overly weighted if the anomaly is counted for each of the services that share the service engine. To more accurately reflect the network configuration, the service engine anomaly score is dampened to 25%. In this example, if the anomaly score was 50 but the actual penalty is 25% of 50, then the service engine anomaly score is 12.5 points. Effectively, this makes the system less sensitive to the anomaly. Dampening to other values is also possible. For example, the dampening value is predefined based on a desired level of sensitivity (e.g., a value between 0 and 100).

A resource penalty factor is given by equation (4), where the resource utilization metrics are resources metrics. In this example, the resources metrics include high availability, pool resources, service engines resources, and traffic policy. High availability is a measure of how often/how much of a resource is available. In some embodiments, high availability is scored on a scale of 0-100 from least available to most available. Pool resources is a measure of pool utilization, e.g., a percentage of components within a pool that is available. In some embodiments, pool resources is scored on a scale of 0-100 from least available to most available. Service engines resources is a measure of service engine utilization. In some embodiments, service engines resources is scored on a scale of 0-100 from least available to most available. Traffic policy is a measure of how much traffic is using open connections on the client side of layer 4. Suppose an administrator sets a maximum number of allowed open connections. The traffic policy is a measure of the percentage of those open connections that are used. For example, when the usage percentage exceeds a threshold (say 80%), a resource penalty is recorded.

A security penalty factor is given by equation (5), where the SSL score is given by max{SSL parameters}. In this example, SSL parameters include PFS, encryption strength, SSL protocol version, and certificate strength. In some embodiments, the SSL score is scored on a scale of 0-5, where 0 is poorest security and 5 is best security. In some embodiments, the DDoS attack score is scored on a scale of 0-5, where 0 is fewest attacks and 5 is most attacks.

FIG. 9 is a data diagram illustrating an example embodiment of a health indicator determination for pool health. A pool health score is computed as health representing all the servers configured in the pool, including infrastructure, backend servers, VM resources, and the pool's uptime. In the example shown in FIG. 9, a health indicator is given by equation (1), where the application performance measurement is given by a pool performance score and the health risk is given by the sum of a pool anomaly penalty factor and a pool resources penalty factor. In some embodiments (not shown), health risk is given by the sum of pool anomaly penalty, a pool resources penalty, and a pool security penalty.

A pool performance score describes the quality of performance of a pool of servers. In some embodiments, the pool performance score is given by a minimum of pool performance metrics, where pool performance metrics include network performance, virtual service, and server up time. The network performance factor can include a layer 4 server apdex. The virtual service factor can include a layer 7 server apdex. The server uptime factor can include a percentage of time within a time period that a layer 4 server is up (e.g., running). Taking the minimum of these metrics highlights the poorest performing component of the pool. In some embodiments, the pool performance score is given on a scale from 0-100, where 0 is poorest performance and 100 is best performance.

A pool anomaly penalty describes any inconsistencies or anomalies in the performance of the pool of servers. In some embodiments, the pool anomaly penalty is given by a pool anomaly score. In some embodiments, the pool anomaly score is given by a maximum of various pool anomaly metrics including network performance anomalies, virtual service anomalies, and a risk score. The network performance anomalies can include a percentage of layer 4 server metrics that are anomalous. The virtual service anomalies can include a percentage of layer 7 metrics that are anomalous. The risk score can include an average risk score. The risk score is a measure of an amount of risk based on metrics that have deviated from their norms, e.g., that are anomalous. In this example, the risk score is calculated by taking a ratio of the metrics that were anomalous to the total metrics for the pool on a per stack basis. For example, the risk score can be scaled down to a predetermined value. The risk score may be scaled according to a weight assigned to the resource utilization. In some embodiments, the assigned weight is determined by an administrator. For example, even if CPU utilization is 100%, the risk score may be scaled down to a maximum of 25 points. In some embodiments, the pool anomaly score is on a scale from 0-100, where 0 is least anomalous and 100 is most anomalous.

A pool resources penalty describes an area that is being relatively heavily utilized compared with other resources. In some embodiments, the pool resources penalty factor is given by a pool resources score. For example, the pool resources score is based on average pool server utilization such as utilization measured by virtual machine statistics. In some embodiments, the pool resources penalty is on a scale from 0-100, where 0 is least utilization and 100 is most utilization.

In some embodiments, health risk further includes a pool security penalty factor. For example, security penalties can be derived from a security profile or any security attacks from a backend server.

Figure 10:
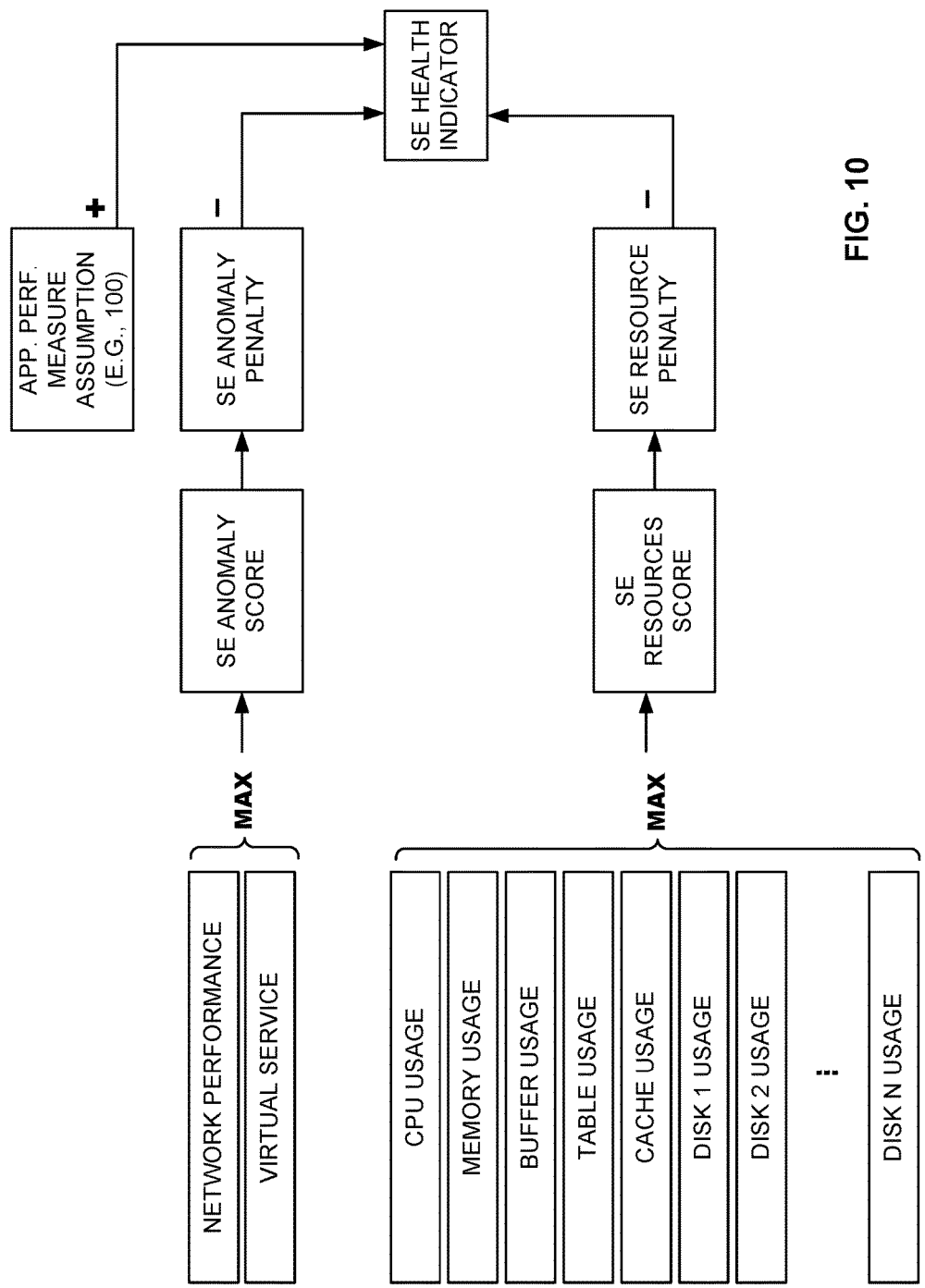
FIG. 10 is a data diagram illustrating an example embodiment of a health indicator determination for a service engine.

FIG. 10 is a data diagram illustrating an example embodiment of a health indicator determination for a service engine. A service engine health indicator is a representation of the health of one or more service engines. In the example shown in FIG. 10, health score is given by equation (1), where the application performance measurement is a predefined performance score. For example, the predefined performance score is assumed to be a full score of 100 (best performance).

Health risk includes the sum of a service engine anomaly penalty and a service engine resources penalty. In some embodiments, the service engine anomaly penalty is given by a service engine anomaly score. For example, the service engine anomaly score is the maximum of service engine anomaly metrics. The maximum highlights the most anomalous areas. Service engine anomaly metrics include network performance anomalies and virtual service anomalies. For example, network performance anomalies include a percentage of service engine metrics that are abnormal. Virtual service anomalies include a percentage of service engine virtual machine metrics that are abnormal.

In some embodiments, the service engine resources penalty is given by a service engine resources score. For example, the service engine resources score is the maximum of service engine anomaly metrics. The maximum highlights the most utilized resources. Service engine resources penalty metrics include usage of: CPU, memory, buffer, table, cache, disk, and the like. CPU usage can include an average percentage of CPU used during a predefined time period. Memory usage can include an average percentage of memory used during a predefined time period. Packet buffer usage can include an average percentage of buffer used during a predefined time period. Table usage can include an average percentage that a persistent table is used during a predefined time period. Cache usage can include an average percentage of cache used for an SSL session. Disk usage can include an average percentage that a disk is used during a predefined time period. Usage for an arbitrary number of disks can be measured (e.g., disk 1 to disk N).

FIG. 11 is an example user interface displaying a health indicator. For example, the user interface of FIG. 11 can be displayed as part of 612 of FIG. 6A. The example user interface includes a first panel 1110 and a second panel 1120. The first panel displays a graph of health score over time, where the y-axis is the health score on a scale of 0-100 and the x-axis is time. The first panel includes information 1102 about the health score including the performance score and the security penalty. In this example, the health score at time 3:45 is 56.0 because the performance score is 76 and the security penalty is 20 and the health score is given by equation (1). Details about the health score at any particular time can be displayed on panel 1110. In this example, the health score at 3:45 is displayed in panel 1104. For example, this information can be displayed in response to user interaction with the user interface such as clicking/touching on the time or hovering the cursor over the time. In some embodiments, panel 1110 includes section 1106 displaying overlay items. Overlay items such as anomalies, alerts, configuration events, and system events can be displayed over the graph shown in panel 1110 to provide additional information about the health score and the factors for why the health score is the value that it is.

Second panel 1120 displays details about how the health score is obtained. In this example, details include the following metrics: performance score, resource penalty, anomaly penalty, security penalty, and health score. In some embodiments, the metrics are displayed with its value for a selected time (3:45 in this example) along with a graph representing the change in its value over time. Of course, other metrics can be displayed and the amount or ordering of the metrics can be pre-defined or user-defined. The visualization of the health score in this manner enables an administrator to easily understand the health score and target any problem areas.

FIG. 12 is an example user interface displaying a performance score. For example, the user interface of FIG. 12 can be displayed as part of 612 of FIG. 6A. The user interface of FIG. 12 can be displayed in response to a request for additional information from another user interface. For example, the user interface of FIG. 12 is displayed in response to a request to maximize/display more information about the performance score graph in panel 1120 of FIG. 11.

The example user interface includes a first panel 1210 and a second panel 1220. The first panel displays a graph of performance score over time, where the y-axis is the performance score on a scale of 0-100 and the x-axis is time. The first panel includes information 1202 about the health score including the performance score and feedback about the performance score (the quality of the application responses is low: (70.0)). In this example, the quality of the responses is determined to be low by comparing the performance score to one or more threshold values and classifying the performance. In this example, the health score at 3:45 is 76.0. Details about the performance score at any particular time can be displayed on panel 1210. In this example, the performance score at 3:45 is displayed in panel 1204. For example, this information can be displayed in response to user interaction with the user interface such as clicking/touching on the time or hovering over the time.

In some embodiments, panel 1210 includes section 1206 displaying overlay items. Overlay items such as anomalies, alerts, configuration events, and system events can be displayed over the graph shown in panel 1210 to provide additional information about the health score and the factors for why the health score is the value that it is. In this example, alerts are shown at times ~3:26, 3:45, and ~3:46. The alerts enable an administrator to quickly identify a problem area by displaying information about causes of the (e.g., low) performance score. As another example, system events are shown at times ~3:26, ~3:31, ~3:36, ~3:41, ~3:46, and 3:50. The system events enable an administrator to quickly identify a problem area by displaying information about system events, which may have caused the (e.g., low) performance score.

Second panel 1220 displays details about how the performance score is obtained. In this example, details include the following indicators: connection apdex, pageload apdex, response apdex, and pool indicators such as pool performance scores. Of course, other metrics can be displayed and the amount or ordering of the metrics can be pre-defined or user-defined. The visualization of the performance score in this manner enables an administrator to easily understand the performance score and target any problem areas.

FIG. 13 is an example user interface displaying a security summary. For example, the user interface of FIG. 13 can be displayed as part of 612 of FIG. 6A. The security summary provides details about the security penalty portion of the performance score calculation (e.g., according to equation (1)).

The example user interface includes a first panel 1310, a second panel 1320, and a third panel 1330. The first panel includes first section 1312 and second section 1314. The first section 1312 visually displays details of SSL transactions including successful transactions and failed transactions. In this example, the displayed SSL details include certificates and TLS versions of connections. For example, the breakdown of certificates is shown as a pie chart with various types of certificates used for the connections. The breakdown of TLS versions is shown as a pie chart with various types of TLS connections. The second section 1314 visually displays details of an SSL score. As described herein, the SSL score is given by various factors including whether PFS is supported, SSL protocol strength, a weakest encryption algorithm, a strength of symmetric encryption cipher, a certificate expiration time, whether client renegotiation is disabled, whether a CA certificate is trusted, etc. As shown, each factor is rated on a scale of 0-5 (0 being least secure). The factor with the lowest rating is highlighted to draw attention to that factor. In this example, the signature algorithm has the lowest rating due to the algorithm being relatively insecure. Thus, the SSL score is the minimum rating from among the factors, which is 4.0.

The second panel 1320 includes a first section 1322 and a second section 1324. The first section displays details about any DDoS attacks that occurred during a predefined time period. The attacks are shown broken down by network (layer 4) attacks, application (layer 7) attacks, the attack duration, and any blocked connections. In this example, no attacks occurred. The second section 1324 displays details about the number of attacks. In this example, attack details are shown in a graph of attack count over time, where the y-axis is the number of attacks on a scale of 0-10 and the x-axis is time. Details about the attack count at any particular time can be displayed on panel 1326. In this example, the attack count at 3:45 is displayed in panel 1326. For example, this information can be displayed in response to user interaction with the user interface such as clicking/touching on the time or hovering over the time.

The third panel 1330 displays details about the security summary and how the security penalty is obtained. In this example, details include the following SSL indicators: TLS version, transactions, key exchange, certificate, and PFS, and the following DDoS indicators: attacks. Of course, other metrics can be displayed and the amount or ordering of the metrics can be pre-defined or user-defined. The visualization of the security summary in this manner enables an administrator to easily understand the security penalty and target any problem areas.

The techniques described herein provide information about health of a group of servers and provide warnings about the servers. In various embodiments, traffic and/or service characteristics are analyzed to provide a holistic report of server health and to provide warnings about changes to server health. Unlike conventional server monitors, which typically do not determine risks associated with a server, the techniques described herein provide detailed information about server health accounting for risks, anomalies, security vulnerabilities, and the like. In one aspect, the detailed information determined and reported according to the techniques described herein allow system administrators to take prophylactic measures to service the system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of evaluating health of a distributed network service environment (DNSE), comprising:
   determining, by a processor, an application performance measurement based at least in part on a plurality of performance metrics associated with a plurality of sources, wherein:
      the plurality of sources are associated with the DNSE;
      the plurality of sources includes one or more service engines and a plurality of servers;
      at least some of the plurality of servers are configured to provide a distributed application; and
      the one or more service engines are configured to provide the plurality of servers with a network service, including by cooperating to carry out a network function of the distributed application and collect at least a part of the plurality of performance metrics;
   determining, by the processor, a health risk of the DNSE based at least in part on a plurality of risk parameters obtained by the one or more service engines;
   combining, by the processor, the application performance measurement and the health risk of the DNSE to determine a health indicator indicating overall health of a stack, wherein the stack includes at least a service engine and at least one server;
   in the event that the health indicator indicates a health change of the DNSE, generating, by the processor, a notification of the health change of the DNSE; and
   outputting, by the processor, the notification of the health change of the DNSE.

2. The method of claim 1, wherein the health indicator is a single value.

3. The method of claim 1, wherein the health indicator indicates one or more of: whether a service level agreement is met, whether resources are over-utilized, whether the DNSE is secure, and/or whether performance of the DNSE is predictable.

4. The method of claim 1, further comprising providing a notification of one or more factors that contributed to the health change of the DNSE.

5. The method of claim 1, wherein the outputting includes displaying the notification.

6. The method of claim 1, wherein the outputting includes outputting the notification in an application programming interface.

7. The method of claim 1, wherein the outputting includes outputting at least one reason for the health change.

8. The method of claim 1, wherein the plurality of performance metrics includes two or more of:
   a client performance metric measuring performance of a client accessing the distributed application;
   a server metric measuring performance of a server providing the distributed application;
   a network metric measuring performance of a network link providing the distributed application; and/or
   a pool availability metric measuring performance of a pool of servers providing the distributed application.

9. The method of claim 1, wherein the plurality of performance metrics includes at least one apdex.

10. The method of claim 1, wherein the determination of the application performance measurement includes applying a function to the plurality of performance metrics.

11. The method of claim 10, wherein the function includes at least one of: a minimum, a maximum, and an average.

12. The method of claim 1, wherein a performance metric in the plurality of performance metrics is determined by:
   collecting samples associated with the performance metric;
   classifying the samples relative to a benchmark; and
   evaluating the performance metric based on classifications of the samples.

13. The method of claim 1, wherein at least some of the plurality of risk parameters are determined by the one or more service engines.

14. The method of claim 1, wherein the plurality of risk parameters measures a virtual server associated with at least one of the one or more service engines and at least one of the plurality of servers, the risk parameters including a security parameter, a resource parameter, and a consistency parameter.

15. The method of claim 14, wherein the resource parameter is based at least in part on resource utilization metrics.

16. The method of claim 14, wherein the security parameter is based at least in part on a combination of SSL configuration settings and attack measurements.

17. The method of claim 14, wherein the consistency parameter is based at least in part on a percentage of metrics that are anomalous as measured against a benchmark.

18. The method of claim 1, wherein the network service provided by the one or more service engines is a distributed network service.

19. A system for evaluating health of a distributed network service environment (DNSE), comprising:
   a processor configured to:
      determine an application performance measurement based at least in part on a plurality of performance metrics associated with a plurality of sources, wherein:
         the plurality of sources are associated with the DNSE;
         the plurality of sources includes one or more service engines and a plurality of servers;
         at least some of the plurality of servers are configured to provide a distributed application; and
         the one or more service engines are configured to provide the plurality of servers with a network service including by cooperating to carry out a network function of the distributed application and collect at least a part of the plurality of performance metrics;
      determine a health risk of the DNSE based at least in part on a plurality of risk parameters obtained by the one or more service engines;
      combine the application performance measurement and the health risk of the DNSE to determine a health indicating overall health of a stack, wherein the stack includes at least a service engine and at least one server;
      in the event that the health indicator indicates a health change of the DNSE, generate a notification of the health change of the DNSE; and
      output the notification of the health change of the DNSE; and
   a memory coupled to the processor and configured to provide the processor with instructions.

20. A computer program product for evaluating health of a distributed network service environment (DNSE), the computer program product being embodied in a non-transitory computer readable storage medium and comprising computer instructions for:
   determining an application performance measurement based at least in part on a plurality of performance metrics associated with a plurality of sources, wherein:
      the plurality of sources are associated with the DNSE;
      the plurality of sources includes one or more service engines and a plurality of servers;
      at least some of the plurality of servers are configured to provide a distributed application; and
      the one or more service engines are configured to provide the plurality of servers with a network service including by cooperating to carry out a network function of the distributed application and collect at least a part of the plurality of performance metrics;
   determining a health risk of the DNSE based at least in part on a plurality of risk parameters obtained by the one or more service engines;
   combining the application performance measurement and the health risk of the DNSE to determine a health indicator indicating overall health of a stack, wherein the stack includes at least a service engine and at least one server;
   in the event that the health indicator indicates a health change of the DNSE, generating a notification of the health change of the DNSE; and
   outputting the notification of the health change of the DNSE.

* * * * *